(12) United States Patent
Gao

(10) Patent No.: US 8,737,808 B2
(45) Date of Patent: May 27, 2014

(54) METHOD AND MOBILE TERMINAL FOR PREVIEWING AND RETRIEVING VIDEO

(75) Inventor: Minggang Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/575,956

(22) PCT Filed: Oct. 18, 2010

(86) PCT No.: PCT/CN2010/077820
§ 371 (c)(1),
(2), (4) Date: Jul. 30, 2012

(87) PCT Pub. No.: WO2011/140783
PCT Pub. Date: Nov. 17, 2011

(65) Prior Publication Data
US 2012/0308205 A1     Dec. 6, 2012

(30) Foreign Application Priority Data
May 14, 2010    (CN) .......................... 2010 1 0175264

(51) Int. Cl.
*H04N 9/80*     (2006.01)

(52) U.S. Cl.
USPC .......................................... 386/241; 386/248

(58) Field of Classification Search
USPC ........... 386/343, 344, 241, 248; 715/721, 723
See application file for complete search history.

(56) References Cited

U.S. PATENT DOCUMENTS

| | | | |
|---|---|---|---|
| 6,100,941 A | 8/2000 | Dimitrova | |
| 6,331,859 B1 * | 12/2001 | Crinon | 345/619 |
| 6,393,054 B1 * | 5/2002 | Altunbasak et al. | 375/240 |
| 6,549,643 B1 * | 4/2003 | Toklu et al. | 382/107 |
| 6,609,134 B1 * | 8/2003 | Chang et al. | 707/741 |
| 8,379,154 B2 * | 2/2013 | Zhang | 348/701 |
| 2012/0027295 A1 * | 2/2012 | Shao | 382/170 |

FOREIGN PATENT DOCUMENTS

| | | |
|---|---|---|
| CN | 1477566 A | 2/2004 |
| CN | 1851710 A | 10/2006 |
| CN | 101201822 A | 6/2008 |
| CN | 101464893 A | 6/2009 |
| CN | 101840435 A | 9/2010 |
| EP | 1026602 A2 | 8/2000 |

OTHER PUBLICATIONS

International Search Report in international application number: PCT/CN2010/077820, mailed on Feb. 24, 2011.

(Continued)

*Primary Examiner* — David Harvey
(74) *Attorney, Agent, or Firm* — Oppedahl Patent Law Firm LLC

(57) ABSTRACT

A method for previewing and retrieving a video is disclosed. The method includes: (101) setting a variable-length buffer sequence; (102) acquiring and processing a video file to obtain images; (103) detecting scene shots in the obtained images and key frames of the scene shots, and storing the detected scene shots and key frames into the variable-length buffer sequence; and (104) acquiring the scene shots and key frames from the variable-length buffer sequence, matching and comparing the scene shots and key frames with a specified target image to perform image retrieval. A mobile terminal for previewing and retrieving a video is further disclosed. With the technical solution, content preview and fast retrieval of a video file are achieved in a mobile terminal with relatively limited processing capacity and memory resources.

13 Claims, 3 Drawing Sheets

(56) References Cited

OTHER PUBLICATIONS

English Translation of the Written Opinion of the International Search Authority in international application number: PCT/CN2010/077820, mailed on Feb. 24, 2011.
Methods of Automatic Video Scene Segmentation Aug. 2003.
Query by Video Clip Sep. 1, 1999.
Video Parsing Retrieval and Browsing Nov. 5, 1995.
Video shot detection and condensed representation Mar. 1, 2006.
Video abstraction systematic review and classification Feb. 1, 2007.
Supplementary European Search Report in European application number: 10851287.2, mailed on Nov. 29, 2012.

* cited by examiner

METHOD AND MOBILE TERMINAL FOR PREVIEWING AND RETRIEVING VIDEO

TECHNICAL FIELD

The disclosure relates to the video management technology in the field of mobile terminals, in particular to a method and a mobile terminal for previewing and retrieving a video.

BACKGROUND

With the fast development of the integrated circuit technology, the mobile terminal has possessed powerful processing capacity and is turning from a simple communication tool into a comprehensive information processing platform. With extremely powerful processing capacity, memory, consolidated storage medium, and computer-like operating system, such a modern mobile terminal is in effect a complete mini computer system capable of performing a complex processing task. With the fast increase of capacity of expandable memory of the mobile terminal, a user can store videos of most formats into a mobile terminal such as a mobile phone, a palmtop, and the like; however, since the data size of a video file is fairly large, when facing a video file of long duration, the user cannot know the content of the video unless he watches the video from its beginning till its end.

Given that there is often much redundancy in the content of the video file, the user can focus on the part of the video content he is interested in if the main scenes of the video file can be acquired; or, if the user has obtained a video image frame and wants to quickly relocate to the position of the frame and watch the video from the position, he usually can search for the position only by manually dragging the video progress bar, wherein it is not only inefficient but is also very likely to miss many scenes desired to watch due to minor shakes since the screen of a mobile terminal such as a mobile phone is too small for easy control of dragging progress. It is therefore hard to achieve accurate relocation with the method above.

In the related art, the method for retrieving content of a video file includes: first capturing video frames and then converting the captured video into multiple pictures, wherein the step is generally implemented by a third-party video decoder or DirectX provided by Microsoft; during the capture of these pictures, comparing the difference of images of multiple adjacent frames and taking those frames of bigger difference as key frames or obtaining the key frames by using another more complex determining method such as a spatio-temporal attention model; and finally, performing complex matching and comparison of the key frames with a target image to be retrieved, for example, determining with a strategy such as an expert system or a neural network; furthermore, in the related art, the result of the retrieval is obtained only after all shots of the video are processed, and thus too much memory will be taken up if all shots of the video are processed without a plan; therefore, such a method is not suitable for the mobile terminal. In addition, with such a method, complex analysis methods of huge amount of computation are adopted in most aspects such as acquisition and matching determination of the key frames, rendering the method only suitable for current computers of increasingly powerful processing capacity; but heavy resource consumption and computation of the method is unbearable for the mobile terminal with relatively limited processing capacity and resources.

SUMMARY

In view of these, the main objective of the disclosure is to provide a method and a mobile terminal for previewing and retrieving a video, which can achieve preview and fast retrieval of content of a video file in a mobile terminal with relatively limited processing capacity and memory resources.

To achieve the objective, the technical solution of the disclosure is implemented as follows:

The disclosure provides a method for previewing and retrieving a video, including: setting a variable-length buffer sequence; the method further includes:

acquiring and processing a video file to obtain images;
detecting scene shots in the obtained images and key frames of the scene shots, and storing the detected scene shots and key frames in the variable-length buffer sequence; and
acquiring the scene shots and key frames from the variable-length buffer sequence, and performing video retrieval by matching and comparing the scene shots and key frames with a specified target image.

In the method, setting the variable-length buffer sequence may be: applying from a Central Processing Unit (CPU) of a mobile terminal for a dynamic memory area in a memory of the mobile terminal, and taking the dynamic memory area as the variable-length buffer sequence.

In the method, detecting the scene shots in the obtained images may be:

setting a sliding window, taking a first frame of the images as a first scene shot, adjusting a frame, which is to be detected and falls in the sliding window, to be at the center of the sliding window; calculating chromaticity histogram difference between the first frame of the images and the frame to be detected, and confirming the frame to be detected as a scene shot when the chromaticity histogram difference meets a certain condition.

In the method, the certain condition may be:
the frame has a greatest chromaticity histogram difference, and the greatest chromaticity histogram difference is two or three times greater than a second greatest chromaticity histogram difference.

In the method, detecting the key frames of the scene shots may be:

sorting frames between the first frame and a detected scene shot according to magnitude of chromaticity histogram differences, and taking three frames with the greatest chromaticity histogram differences as the key frames of the scene shot.

In the method, performing video retrieval by matching and comparing the scene shots and key frames with the target image may be:

calculating degrees of match between the scene shots and the target image, and degrees of match between the key frames and the target image; determining whether the degrees of match between the scene shots and the target image reach a threshold of degree of match; when none of the degrees of match between the scene shots and the target image reaches the threshold of degree of match, determining whether the degrees of match between the key frames and the target image reach the threshold of degree of match; when none of the degrees of match between the key frames and the target image reaches the threshold of degree of match, determining that the matching fails, and ending the video retrieval; when a degree of match between a key frame and the target image reaches the threshold of degree of match, determining that the matching succeeds, ending the video retrieval, and executing a notification mechanism of successful retrieval.

In the method, determining whether the degrees of match between the scene shots and the target image reach the threshold of degree of match may be:

setting the threshold of degree of match, randomly selecting a scene shot from all the scene shots, determining whether the degree of match between the scene shot and the target image reaches the threshold of degree of match, if not, selecting another scene shot till all the scene shots are determined or till a scene shot with a degree of match which reaches the threshold of degree of match is found.

In the method, calculating the degrees of match between the scene shots and the target image, and the degrees of match between the key frames and the target image may be:

dividing the image of the scene shots or key frames into zones, calculating an average Red-Green-Blue (RGB) value of each zone, calculating a difference between the average RGB value of each zone and an RGB value of a corresponding zone in the target image, summing over all the differences and performing normalization on the sum to obtain degree of image difference of each zone, and summing over the degrees of image difference of all the zones and calculating an average value of degree of image difference.

In the method, determining whether the degrees of match between the key frames and the target image reach the threshold of degree of match may be:

when none of the degrees of match between the scene shots and the target image reaches the threshold, prioritizing the scene shots in descending order of the degrees of match, determining whether the degree of match between any key frame of the scene shot with the top priority and the target image reaches the threshold of degree of match, if not, determining whether the degrees of match between the other key frames of the scene shot and the target image reach the threshold of degree of match; if none of the degrees of match between the three key frames of the scene shot with the top priority and the target image reaches the threshold of degree of match, determining whether the degrees of match between the key frames of the scene shot with the second highest priority and the target image reach the threshold of degree of match.

In the method, executing the notification mechanism of successful retrieval may be:

presetting a shared variable, setting the shared variable to be true when the matching succeeds, determining whether the shared variable is set to be true before each detection of a new scene shot or key frame, ending the detection when the shared variable is set to be true, otherwise continuing the detection.

The disclosure further provides a mobile terminal for previewing and retrieving a video, including: an acquisition module, a detection module, a variable-length buffer sequence, and a video retrieval module, wherein the acquisition module is configured to acquire and process a video file to obtain images and send the obtained images to the detection module;

the detection module is configured to detect scene shots in the obtained images and key frames of the scene shots, and store the detected scene shots and key frames into the variable-length buffer sequence;

the variable-length buffer sequence is configured to store the scene shots and key frames sent by the detection module; and the video retrieval module is configured to acquire the scene shots and key frames from the variable-length buffer sequence, and match and compare the scene shots and key frames with the specified target image to perform video retrieval.

The mobile terminal may further include a setting module configured to set the variable-length buffer sequence and a threshold of degree of match.

The method and mobile terminal of the disclosure for previewing and retrieving a video have the following advantages:

1) In the disclosure, the detection thread of the scene shots and key frames and the video retrieval thread are independent of each other and interact through a variable-length buffer sequence so as to avoid meaningless waiting caused by difference in processing time; only a few scene shots and key frames, instead of all frames of the images, are stored in the variable-length buffer sequence in this disclosure, so as to significantly reduce the amount of processed data of the video retrieval thread and the consumption of memory; furthermore, the variable-length buffer sequence will be emptied every time after the video retrieval thread acquires all scene shots and key frames from the variable-length buffer sequence, therefore reducing the utilization rate of the memory and enhancing the processing speed of the system.

2) In the disclosure, degrees of match between the scene shots and the target image, and degrees of match between the key frames and the target image are calculated respectively, the scene shots and key frames are prioritized in descending order of the degrees of match, and the scene shot or key frame with the largest degree of match is retrieved preferentially, therefore increasing the probability of successful video retrieval and reducing cost of time and system resources.

3) A notification mechanism of successful retrieval is added in the disclosure to inform the two threads to stop working and immediately give the result of the video retrieval without the need to process the whole video once the retrieval succeeds during the video retrieval, therefore significantly improving retrieval speed.

DETAILED DESCRIPTION

The basic idea of the disclosure is: setting a variable-length buffer sequence, and acquiring and processing a video file to obtain images; detecting the scene shots in the obtained images and the key frames of the scene shots and storing the detected scene shots and key frames in the variable-length buffer sequence; acquiring the scene shots and key frames from the variable-length buffer sequence, and matching and comparing the scene shots and key frames with a specified target image to perform video retrieval.

The disclosure is further elaborated below with reference to drawings and specific embodiments.

Figure 1:
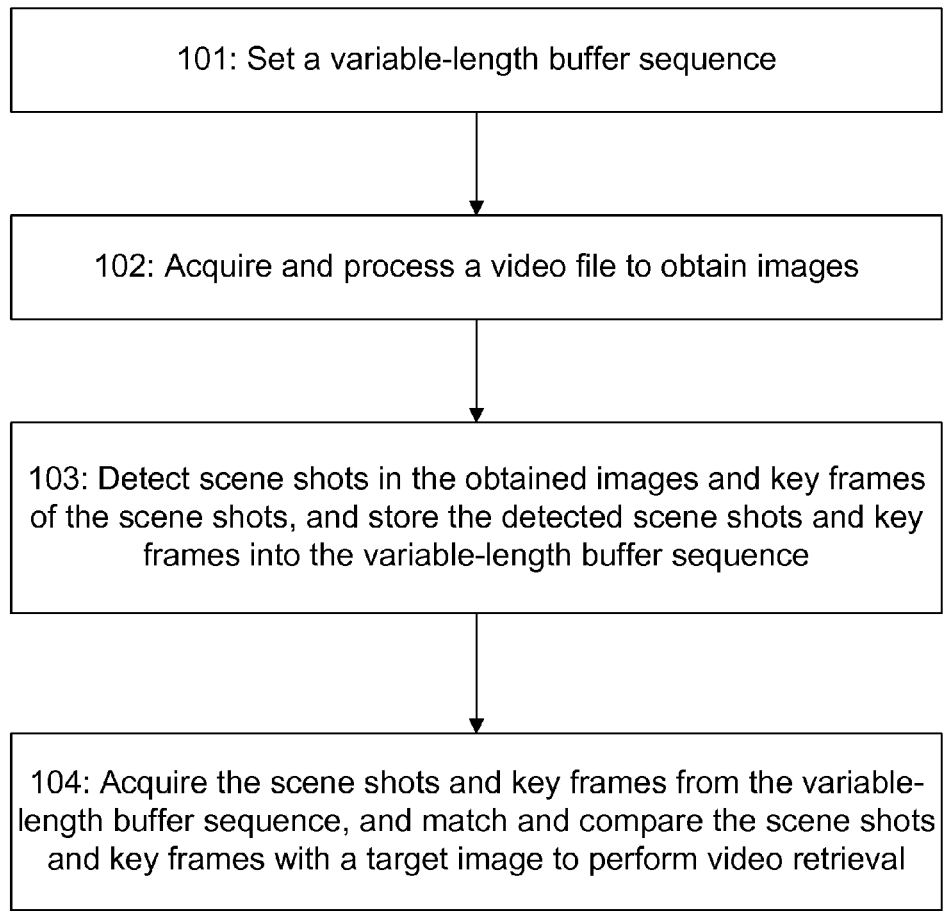
FIG. 1 is a diagram showing the flow of a method of the disclosure for previewing and retrieving a video.

FIG. 1 is a diagram showing the flow of a method of the disclosure for previewing and retrieving a video. As shown in this figure, the method includes:

Step 101: Setting a variable-length buffer sequence;

specifically, before the detection thread of the scene shots and key frames is executed, it applies to the CPU of a mobile terminal for a memory area located in the memory of the mobile terminal, wherein the memory area may serve as the variable-length buffer sequence, as a transfer station of resources, for storing the acquired scene shots and key frames and providing them for the video retrieval; the memory area is a dynamic memory area, and is released as the variable-length buffer sequence is emptied after the scene shots and key frames are read from the variable-length buffer sequence; and the largest capacity of the memory area may be the largest memory capacity that is available for an application program to use allowed by the operating system of the mobile terminal.

Step 102: Acquiring and processing a video file to obtain images;

specifically, acquire from the memory media of the mobile terminal a pre-stored video file, which is essentially a binary stream, so it is only necessary to sequentially read the binary stream of the video file from the memory media, namely, read the initial description field of the video file, obtain the basic attributes of the video file, including length, width, bit rate, length, etc. of the video file, and decode the binary stream of the video file after the description field of the video is obtained.

For the example of a standard video file of the Moving Pictures Experts Group (MPEG), the specific decoding process is: performing variable length coding on the binary stream data of the video file, obtaining, via the inverse transformation algorithm of 8*8 discrete cosine transformation, the Y'CbCr component of an image of the video file according to the encoded data, performing motion compensation on the Y'CbCr component of the image, and obtaining a bitmap image after the Y'CbCr component of the image is converted into an RGB component. Here, the memory media may include a memory card, a T card, or other memory media of the mobile terminal.

Step 103: Detecting the scene shots in the obtained images and the key frames of the scene shots, and storing the detected scene shots and key frames in the variable-length buffer sequence.

Step 104: Acquiring the scene shots and key frames from the variable-length buffer sequence, and matching and comparing the scene shots and key frames with a specified target image to perform video retrieval.

In the process, Step 103 may be called the detection thread of the scene shots and key frames, and Step 104 may be called the video retrieval thread, wherein the two threads are two independent working threads interacting through the variable-length buffer sequence. Thus, the two threads can work in parallel so as to significantly improve processing efficiency and reduce occupancy rate of the memory.

Figure 2:
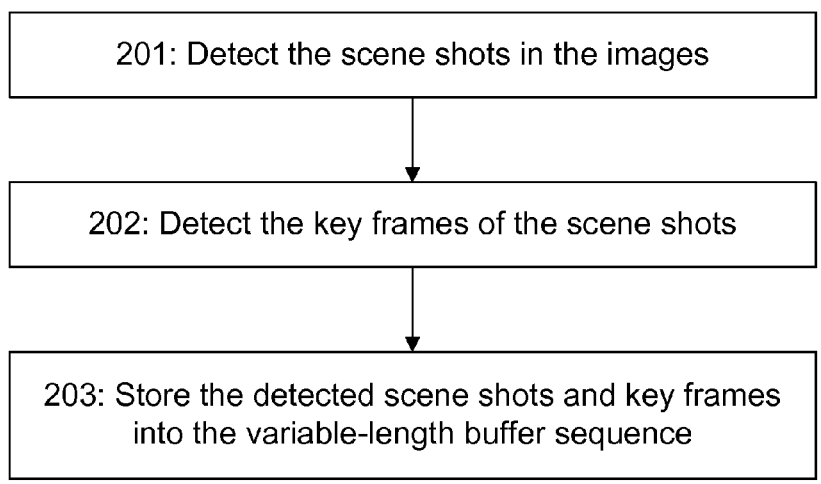
FIG. 2 is a diagram showing the flow of a method of the disclosure for detecting scene shots in an obtained image and key frames of the scene shots and storing the detected scene shots and key frames in a variable-length buffer sequence.

FIG. 2 is the specific implementation process of Step 103 in FIG. 1 and shows the steps of the method of the disclosure for detecting the scene shots in the obtained images and the key frames of the scene shots, and storing the detected scene shots and key frames into the variable-length buffer sequence; as shown in this figure, the method includes:

Step 201: Detecting the scene shots in the images;

specifically, the scene shots in the images may be detected by methods such as a global threshold method, a sliding window method, a dual window method, a spatio-temporal slice method, and the like, wherein the sliding window method is adopted to explain how to detect the scene shots in the images in the embodiment, including:

setting a sliding window with a time duration of 2M+1, opening the images in the sliding window, wherein the initial frame (i.e. the first frame) in the images is the first scene shot, and adjusting the Kth frame to be detected in the sliding window to be at the center of the sliding window, wherein M represents the length of the video file;

calculating the chromaticity histogram difference between the first frame and the Kth frame in the images by the formula $$D = \sum_{k=0}^{k-1} |H[f(x, y, t), k] - H[f(x, y, t+1), k]|,$$

where H[f(x,y,t),k] represents the chromaticity histogram statistics of the Kth frame in the sliding window, wherein K=0, 1, . . . , K−1⁻; and confirming the Kth frame as a scene shot when D simultaneously meets the following two conditions: (1) the Kth frame of the sliding window has the largest D, and (2) D>k*$D_2$, where $D_2$ is the second largest D in the sliding window and k is a positive number; here, it should be noted that the size of the sliding window should be selected to be less than the distance between two scene shots, for example, a video file with a frame rate of 20 frames/second indicates that it is impossible to switch scene shots twice within 1 second, and when the size of the sliding window is set to be 20 too, the shortest time for switching a scene shot will be considered to be 20 frames, i.e., 1 s; the second condition is proposed to prevent a large interframe chromaticity histogram difference from being continuously generated during the fast translation or zooming of a camera; therefore, K is generally recommended to be 2 or 3 for better detection effect; with the method, N scene shots may be detected starting from the second frame of the images.

Step 202: Detecting the key frames of the scene shots;

specifically, detecting three key frames of a scene shot whenever the scene shot is detected, wherein the chromaticity histogram differences between all the frames in the sliding window have been calculated in Step 201, sorting the frames between the first frame and the detected scene shot according to the magnitudes of the chromaticity histogram differences, and taking the three frames with the greatest chromaticity histogram differences as the key frames of the scene shot.

The scene shot and key frames are essentially the same and both are frames of the images, but with different status: the scene shot is a frame causing abrupt transition of the scene, while the key frames are representative frames in all the frames between the initial frame of the images and the scene shot and are subordinate only to the scene shot in importance.

Step 203: Storing the detected scene shots and key frames into the variable-length buffer sequence;

specifically, storing the detected scene shots and key frames into the variable-length buffer sequence to wait for the acquisition of the video retrieval thread, then executing Step 201 to detect the next scene shot.

The scene shot and key frames are essentially the same and both are frames of the images but with different status: the scene shot is a frame causing abrupt transition of the scene, while the key frames are representative frames in all the frames between the initial frame of the images and the scene shot and are subordinate only to the scene shot in importance, and the key frames are supplementary description of the scene shot; the detection of the scene shots and key frames is the basis of the video retrieval, and the scene shots and key frames characterize the main content of a video file and are used as the preview of the video file.

Figure 3:
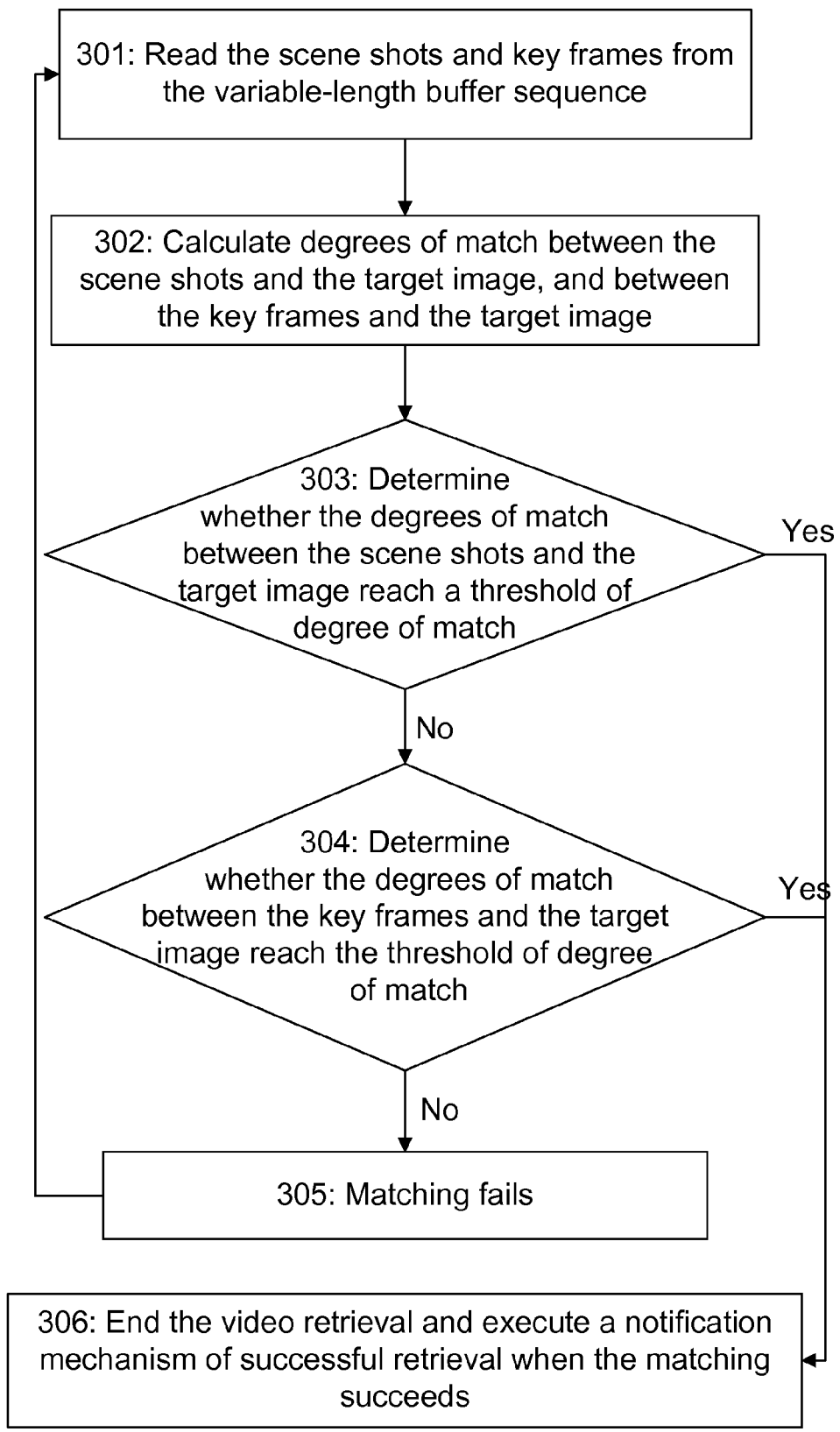
FIG. 3 is a diagram showing the flow of a method of the disclosure for reading scene shots and key frames from a variable-length buffer sequence, and matching and comparing the scene shots and key frames with a specified target image to perform video retrieval.

FIG. 3 is the specific implementation process of Step 104 in FIG. 1, and shows the steps of the method of the disclosure for reading the scene shots and key frames from the variable-length buffer sequence, and matching and comparing the scene shots and key frames with the target image to perform video retrieval; as shown in this figure, the method includes:

Step 301: Reading the scene shots and key frames from the variable-length buffer sequence;

specifically, read from the variable-length buffer sequence the detected scene shots and key frames that occupy memory space, and empty, after the reading is complete, the variable-length buffer sequence so as to store scene shots and key frames detected later; wherein a parameter N may be set in the video retrieval thread, and the scene shots and key frames may be read from the variable-length buffer sequence when the number of the scene shots stored in the variable-length buffer sequence reaches N, wherein the value of N may specifically be set by setting an interface.

Step 302: Calculating the degrees of match between the scene shots and the specified target image, and between the key frames and the target image;

specifically, calculate the respective degrees of match between each scene shot and the target image, and between the three key frames of each scene shot and the target image, wherein the degree of match may be measured by a degree of match of image chromaticity and has the same calculation process as both the scene shots and key frames are essentially images;

The calculation process is described with the example of a scene shot: in order to reduce the influence of noise and amount of calculation, divide the width of the image of the scene shot evenly into m parts and divide the height of the image of the scene shot evenly into n parts, namely, the image of the scene shot is divided into m*n zones; calculate average RGB value of each zone by summing over the RGB values of the image and then dividing the sum by the number of pixels; then calculate the difference between the average RGB value of each zone and the RGB value of a corresponding zone in the target image, sum over all the differences, and perform normalization of the sum to obtain the degree of image difference of each zone; wherein the normalization is performed using the formula $$P_{i,j} = 1 - \frac{|R_s(x_i, x_j) - R_t(x_i, y_j)| + |G_s(x_i, y_j) - G_t(x_i, y_j)| + |B_s(x_i, y_j) - B_t(x_i, y_j)|}{R_t(x_i, y_i) + G_t(x_i, x_j) + B_t(x_i, y_j)}$$

where i, represents a row in the zone, j represents a column in the zone, and $R_s$, $G_s$, $B_s$, and $R_t$, $G_t$, $B_t$ respectively represent RGB values of the images of the zone and of a corresponding zone in the target image; the degree of match between the whole image and the target image may be obtained by summing over the degrees of image difference of all the zones of the image of the scene shot and calculating the average value, wherein the formula for calculating the average value is $$P = \frac{1}{m \times n} \sum_{i=1}^{M} \sum_{j=1}^{n} P_{i,j},$$

where P is the degree of match between the image and the target image. The degree of match between each scene shot and the target image and that between each key frame and the target image is calculated with the method, and all the calculated degrees of match are stored in the memory of the mobile terminal in the process of the video retrieval thread and are deleted from the memory after the video retrieval thread completes.

Step 303: Determining whether the degrees of match between the scene shots and the target image reach the threshold of degree of match, if not, executing Step 304, otherwise executing Step 306;

specifically, the threshold of degree of match may be set by setting the interface according to an acceptable error range; randomly select a scene shot from all the scene shots, determine whether the degree of match P between the scene shot and the target image reaches the threshold of degree of match, if not, select another scene shot again till all the scene shots are determined; execute Step 304 if none of the degrees of match P between the scene shots and the target image reaches the threshold of degree of match, and execute Step 306 once a degree of match P between a scene shot and the target image reaches the threshold.

Step 304: Determining whether the degrees of match between the key frames and the target image reach the threshold of degree of match, if not, executing Step 305, otherwise executing Step 306;

specifically, when none of the degrees of match P between the scene shots and the target image reaches the threshold, as the degrees of match P between all the key frames and the target image have been calculated in Step 301, prioritize the scene shots in descending order of the degrees of match P, determine whether the degree of match P between any key frame of the scene shot with the top priority and the target image reaches the matching threshold, if not, determine whether the degrees of match P between other key frames of the scene shot and the target image reach the threshold of degree of match; if none of the degrees of match P between the three key frames of the scene shot with the top priority and the target image reaches the threshold of degree of match, determine whether the degrees of match P between the key frames of the scene shot with the second highest priority and the target image reach the threshold of degree of match; execute Step 305 if none of the degrees of match P between the three key frames of each scene shot and the target image reaches the threshold of degree of match, and execute Step 306 once a degree of match P between one key frame and the target image reaches the threshold of degree of match.

By starting the determination from the scene shot with the highest degree of match, the chance of successful video retrieval may be enhanced and the computational complexity may be reduced; in addition, the scene shots represent part, rather than all, of the images, so it does not mean that there is no chance of successful match in other scene shots, therefore, even it is determined that the highest degree of match between the scene shot and the target image fails to meet the threshold of degree of match, it is still necessary to determine whether the degrees of match between other scene shots and the target image meet the threshold of degree of match.

Step 305: ending the video retrieval or returning to Step 301 when matching fails;

here, if the matching fails, either end the video retrieval, or return to Step 301 to start the video retrieval flow again.

Step 306: ending the video retrieval and executing a notification mechanism of successful retrieval when matching succeeds;

specifically, once matching succeeds, the video retrieval thread is ended and the notification mechanism of successful retrieval is executed at once, i.e., the scene shots and key frames are notified that the video retrieval thread has performed successful matching and the video retrieval has been ended; the execution of mechanism of successful retrieval is:

setting a preset variable shared by a detection thread of the scene shots and key frames and the video retrieval thread to be true once the matching succeeds in the video retrieval thread, determining whether the shared variable is true before each detection of a new scene shot or key frame, if so, ending the detection, otherwise continuing the detection.

Here, once a key frame is found, it means that the degree of match between the key frame and the target image reaches the threshold of degree of match, then the video retrieval completes and the notification mechanism of successful retrieval is executed at once to give the result of the video retrieval without the need to determine respectively the degrees of match between all the scene shots and the target image, and those between all the key frames and the target image, thereby reducing the amount of calculation of the mobile terminal and the amount of occupied memory of the mobile terminal.

Figure 4:
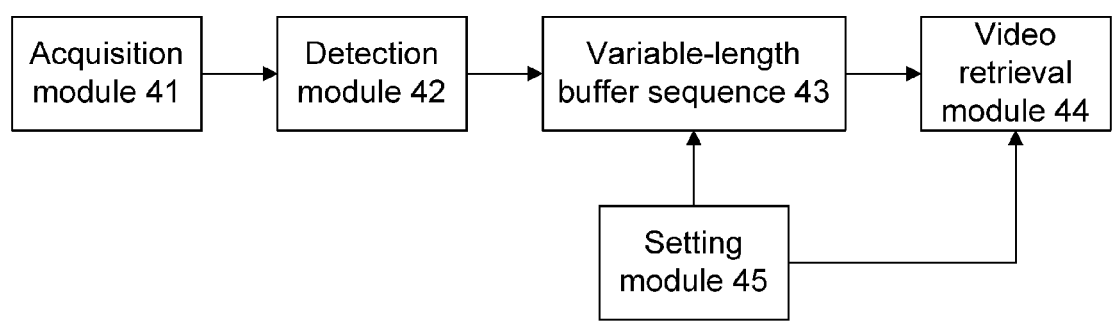
FIG. 4 is a diagram showing the structure of a mobile terminal of the disclosure for previewing and retrieving a video.

In order to implement the method, the disclosure further provides a mobile terminal for previewing and retrieving a video, as shown in FIG. 4, wherein the mobile terminal includes: an acquisition module 41, a detection module 42, a variable-length buffer sequence 43, and a video retrieval module 44, wherein the acquisition module 41 is configured to acquire and process a video file to obtain images and send the obtained images to the detection module 42;

the detection module 42 is configured to detect the scene shots in the obtained images and the key frames of the scene shots, and store the detected scene shots and key frames into the variable-length buffer sequence 43;

the variable-length buffer sequence 43 is configured to store the scene shots and key frames sent by the detection module 42; and the video retrieval module 44 is configured to acquire the scene shots and key frames from the variable-length buffer sequence 43, and match and compare the scene shots and key frames with a specified target image to perform video retrieval.

The mobile terminal further includes:

a setting module 45 which is configured to set the variable-length buffer sequence and the threshold of degree of match.

What described above are only preferred embodiments of the disclosure, and are not intended to limit the scope of protection of the disclosure; and any modifications, equivalent replacements, improvements, and the like made within the spirit and principle of the disclosure shall fall within the scope of protection of the disclosure.

What is claimed is:

1. A method for previewing and retrieving a video, comprising:
    setting a variable-length buffer sequence; and further comprising:
        acquiring and processing a video file to obtain images;
        detecting scene shots in the obtained images and key frames of the scene shots, and storing the detected scene shots and key frames in the variable-length buffer sequence; and
        acquiring the scene shots and key frames from the variable-length buffer sequence, and performing video retrieval by matching and comparing the scene shots and key frames with a specified target image,
        wherein the performing video retrieval by matching and comparing the scene shots and key frames with the target image is:
        calculating degrees of match between the scene shots and the target image, and degrees of match between the key frames and the target image; determining whether the degrees of match between the scene shots and the target image reach a threshold of degree of match; when none of the degrees of match between the scene shots and the target image reaches the threshold of degree of match, determining whether the degrees of match between the key frames and the target image reach the threshold of degree of match; when none of the degrees of match between the key frames and the target image reaches the threshold of degree of match, determining that the matching fails, and ending the video retrieval; when a degree of match between a key frame and the target image reaches the threshold of degree of match, determining that the matching succeeds, ending the video retrieval, and executing a notification mechanism of successful retrieval.

2. The method according to claim 1, wherein the setting the variable-length buffer sequence is: applying from a Central Processing Unit (CPU) of a mobile terminal for a dynamic memory area in a memory of the mobile terminal, and taking the dynamic memory area as the variable-length buffer sequence.

3. The method according to claim 1, wherein the detecting the scene shots in the obtained images is:
    setting a sliding window, taking a first frame of the images as a first scene shot, adjusting a frame, which is to be detected and falls in the sliding window, to be at the center of the sliding window; calculating chromaticity histogram difference between the first frame of the images and the frame to be detected, and confirming the frame to be detected as a scene shot when the chromaticity histogram difference meets a certain condition.

4. The method according to claim 3, wherein the certain condition is:
    the frame has a greatest chromaticity histogram difference, and the greatest chromaticity histogram difference is two or three times greater than a second greatest chromaticity histogram difference.

5. The method according to claim 2, wherein detecting the key frames of the scene shots is:
    sorting frames between the first frame and a detected scene shot according to magnitude of chromaticity histogram differences, and taking three frames with the greatest chromaticity histogram differences as the key frames of the scene shot.

6. The method according to claim 1, wherein the determining whether the degrees of match between the scene shots and the target image reach the threshold of degree of match is:
    setting the threshold of degree of match, randomly selecting a scene shot from all the scene shots, determining whether the degree of match between the scene shot and the target image reaches the threshold of degree of match, if not, selecting another scene shot till all the scene shots are determined or till a scene shot with a degree of match which reaches the threshold of degree of match is found.

7. The method according to claim 1, wherein calculating the degrees of match between the scene shots and the target image, and the degrees of match between the key frames and the target image is:
    dividing the image of the scene shots or key frames into zones, calculating an average Red-Green-Blue (RGB) value of each zone, calculating a difference between the average RGB value of each zone and an RGB value of a corresponding zone in the target image, summing over all the differences and performing normalization on the sum to obtain degree of image difference of each zone, and summing over the degrees of image difference of all the zones and calculating an average value of degree of image difference.

8. The method according to claim 1, wherein the determining whether the degrees of match between the key frames and the target image reach the threshold of degree of match is:
when none of the degrees of match between the scene shots and the target image reaches the threshold, prioritizing the scene shots in descending order of the degrees of match, determining whether the degree of match between any key frame of the scene shot with the top priority and the target image reaches the threshold of degree of match; if not, determining whether the degrees of match between the other key frames of the scene shot and the target image reach the threshold of degree of match; if none of the degrees of match between the three key frames of the scene shot with the top priority and the target image reaches the threshold of degree of match, determining whether the degrees of match between the key frames of the scene shot with the second highest priority and the target image reach the threshold of degree of match.

9. The method according to claim 1, wherein the executing the notification mechanism of successful retrieval is:
presetting a shared variable, setting the shared variable to be true when the matching succeeds, determining whether the shared variable is set to be true before each detection of a new scene shot or key frame, ending the detection when the shared variable is set to be true, otherwise continuing the detection.

10. The method according to claim 3, wherein detecting the key frames of the scene shots is:
sorting frames between the first frame and a detected scene shot according to magnitude of chromaticity histogram differences, and taking three frames with the greatest chromaticity histogram differences as the key frames of the scene shot.

11. The method according to claim 4, wherein detecting the key frames of the scene shots is:
sorting frames between the first frame and a detected scene shot according to magnitude of chromaticity histogram differences, and taking three frames with the greatest chromaticity histogram differences as the key frames of the scene shot.

12. A mobile terminal for previewing and retrieving a video, the mobile terminal comprising one or more processors for implementing:
an acquisition module is configured to acquire and process a video file to obtain images and send the obtained images to the detection module;
a detection module is configured to detect scene shots in the obtained images and key frames of the scene shots, and store the detected scene shots and key frames into the variable-length buffer sequence;
a variable-length buffer sequence is configured to store the scene shots and key frames sent by the detection module; and
a video retrieval module is configured to acquire the scene shots and key frames from the variable-length buffer sequence, and match and compare the scene shots and key frames with a specified target image to perform video retrieval,
wherein the performing video retrieval by matching and comparing the scene shots and key frames with the target image is:
calculating degrees of match between the scene shots and the target image, and degrees of match between the key frames and the target image; determining whether the degrees of match between the scene shots and the target image reach a threshold of degree of match; when none of the degrees of match between the scene shots and the target image reaches the threshold of degree of match, determining whether the degrees of match between the key frames and the target image reach the threshold of degree of match; when none of the degrees of match between the key frames and the target image reaches the threshold of degree of match, determining that the matching fails, and ending the video retrieval; when a degree of match between a key frame and the target image reaches the threshold of degree of match, determining that the matching succeeds, ending the video retrieval, and executing a notification mechanism of successful retrieval.

13. The mobile terminal according to claim 12, wherein the one or more processors are further configured to implement a setting module, and the setting module is configured to set the variable-length buffer sequence and a threshold of degree of match.

* * * * *